United States Patent
Pitsch et al.

(10) Patent No.: US 9,835,281 B2
(45) Date of Patent: Dec. 5, 2017

(54) NO-TOOLS SPREAD FAUCET ASSEMBLY, KITS AND METHODS

(75) Inventors: Walter Pitsch, Washington, NJ (US); Hsiao Chang Li, Edison, NJ (US); Xiao Jing Ye, Guang Zhou (CN)

(73) Assignee: AS IP Holdco, LLC, Piscataway, NJ (US)

( * ) Notice: Subject to any disclaimer, the term of this patent is extended or adjusted under 35 U.S.C. 154(b) by 0 days.

(21) Appl. No.: 13/594,698

(22) Filed: Aug. 24, 2012

(65) Prior Publication Data

US 2013/0220439 A1   Aug. 29, 2013

Related U.S. Application Data

(60) Provisional application No. 61/527,001, filed on Aug. 24, 2011.

(51) Int. Cl.
  *F16K 27/00* (2006.01)
  *F16L 55/07* (2006.01)
  (Continued)

(52) U.S. Cl.
  CPC ............ *F16L 55/07* (2013.01); *E03C 1/0401* (2013.01); *E03C 1/0403* (2013.01); *F16B 37/08* (2013.01);
  (Continued)

(58) Field of Classification Search
  CPC .... E03C 1/04; E03C 1/0401; E03C 2001/028; F16B 37/0864; B25B 13/08; B25B 13/06; B25B 13/16; F16L 55/07
  (Continued)

(56) References Cited

U.S. PATENT DOCUMENTS 638,611 A    12/1899  Totham
1,434,401 A * 11/1922  Mueller ................. B25B 13/08
                                                              81/124.2
(Continued)

FOREIGN PATENT DOCUMENTS

CA   2 638 466      2/2010
CA   2638466 A1    2/2010
(Continued)

OTHER PUBLICATIONS

Delta 155, Single Lever Widespread Kitchen Faucets, Mar. 15, 2010, "http://s2.img-b.com/faucetdirect.com/mediabase/specifications/delta/86363/delta_155dst_inst_1027.pdf".*
(Continued)

*Primary Examiner* — Reinaldo Sanchez-Medina
(74) *Attorney, Agent, or Firm* — Morrison & Foerster LLP

(57) ABSTRACT

A spread faucet assembly, an installation kit, and an installation method are described herein. The spread faucet assembly has a spout assembly with a spout, a tailpiece, and at least one fluid inlet conduit. It also include at least one valve assembly having a shank, an fluid inlet conduit, a fluid outlet conduit and a valve cartridge, wherein the shank has an inner surface having a fluid receiving area in fluid communication with the valve cartridge and the fluid outlet conduit, the inner surface defines an opening in fluid communication with the valve cartridge and valve assembly fluid inlet conduit, and the valve cartridge is positioned in the opening. A connector is also included for coupling the at least one valve assembly fluid outlet conduit with the at least one spout assembly fluid inlet conduit. A self-turning nut assembly is also provided having a nut with an outer surface and a tightening sleeve having an outer surface with at least
(Continued)

one outwardly extending projection for securing the nut to a fluid supply connection.

24 Claims, 12 Drawing Sheets

(51) Int. Cl.
  *E03C 1/04* (2006.01)
  *F16B 37/08* (2006.01)
(52) U.S. Cl.
  CPC ...... *Y10T 137/0441* (2015.04); *Y10T 137/598* (2015.04); *Y10T 137/87579* (2015.04)
(58) Field of Classification Search
  USPC ....... 137/315.12, 606, 603, 801; 4/675, 676, 4/695; 411/427–436; 403/21; 81/124.2, 81/176.1, 176.2
  See application file for complete search history.

(56) References Cited

U.S. PATENT DOCUMENTS

| | | | |
|---|---|---|---|
| 1,475,907 A | 11/1923 | Volman | |
| 2,374,309 A * | 4/1945 | Roxs | 411/432 |
| 2,634,944 A | 11/1948 | Waite | |
| 2,503,364 A * | 4/1950 | Viets | B25B 13/06 81/124.2 |
| 2,691,912 A * | 10/1954 | Jones | B25B 13/08 29/275 |
| 2,784,987 A | 3/1957 | Corcoran | |
| 3,175,435 A * | 3/1965 | Pollack | B25B 13/04 81/124.2 |
| 3,599,260 A | 8/1971 | Lesh | |
| 3,695,139 A | 10/1972 | Howe | |
| 3,780,758 A | 12/1973 | DeVries | |
| 3,834,416 A | 9/1974 | Parkison | |
| 4,275,907 A | 6/1981 | Hunt | |
| 4,281,857 A * | 8/1981 | Randall | E03C 1/0401 24/498 |
| 4,288,113 A | 9/1981 | Saulnier | |
| 4,451,069 A | 5/1984 | Melone | |
| 4,502,165 A * | 3/1985 | Szemeredi et al. | 4/695 |
| 4,659,273 A | 4/1987 | Dudley | |
| 4,793,375 A | 12/1988 | Marty | |
| 4,889,368 A | 12/1989 | Laipply | |
| 4,890,964 A | 1/1990 | Lindley et al. | |
| 4,895,570 A | 1/1990 | Larkin | |
| 4,915,421 A | 4/1990 | Dennany, Jr. | |
| 5,027,671 A | 7/1991 | Erikson et al. | |
| 5,029,904 A | 7/1991 | Hunt | |
| 5,054,743 A | 10/1991 | Norkey et al. | |
| 5,087,081 A | 2/1992 | Yoon | |
| 5,100,275 A | 3/1992 | Schirrmacher | |
| 5,127,438 A | 7/1992 | Williams | |
| 5,141,372 A | 8/1992 | Donner | |
| 5,176,050 A * | 1/1993 | Sauer et al. | 81/471 |
| 5,297,458 A * | 3/1994 | Smith | B25B 13/06 81/124.2 |
| 5,398,717 A | 3/1995 | Goncze | |
| 5,402,827 A | 4/1995 | Gonzalez | |
| 5,417,242 A | 5/1995 | Goncze | |
| RE35,545 E | 7/1997 | Chrysler | |
| 5,725,008 A | 3/1998 | Johnson | |
| 5,822,811 A | 10/1998 | Ko | |
| 5,908,163 A | 6/1999 | Wells | |
| 5,944,467 A | 8/1999 | Yuta | |
| 5,946,746 A | 9/1999 | Bloom | |
| 5,979,777 A | 11/1999 | Ems | |
| 5,983,917 A * | 11/1999 | Thomas | 137/15.18 |
| 6,073,647 A | 6/2000 | Cook et al. | |
| 6,073,972 A * | 6/2000 | Rivera | 285/64 |
| 6,085,784 A | 7/2000 | Bloom et al. | |
| 6,202,695 B1 | 3/2001 | Wu | |
| 6,209,153 B1 * | 4/2001 | Segien, Jr. | 4/695 |
| 6,231,089 B1 | 5/2001 | DeCler et al. | |
| 6,240,798 B1 | 6/2001 | Erikson et al. | |
| 6,250,692 B1 | 6/2001 | Ito et al. | |
| 6,263,919 B1 | 7/2001 | Knapp | |
| 6,299,215 B1 | 10/2001 | Kirby | |
| 6,361,260 B1 | 3/2002 | Schirmacher | |
| 6,405,749 B1 | 6/2002 | Bloom et al. | |
| 6,434,765 B1 * | 8/2002 | Burns et al. | 4/676 |
| 6,488,320 B1 | 12/2002 | Anderson | |
| 6,497,433 B1 | 12/2002 | Ketcham | |
| 6,631,730 B1 | 10/2003 | Bloom et al. | |
| 6,672,628 B2 | 1/2004 | Thomas et al. | |
| 6,678,903 B1 | 1/2004 | Rhodes | |
| 6,684,906 B2 | 2/2004 | Burns et al. | |
| 6,786,516 B2 | 9/2004 | Cronley | |
| 6,880,587 B1 | 4/2005 | Carter et al. | |
| 7,003,818 B2 | 2/2006 | McNerney et al. | |
| 7,077,153 B2 | 7/2006 | Segien, Jr. | |
| 7,077,382 B2 | 7/2006 | Klinger | |
| 7,108,011 B1 | 9/2006 | Lordahl et al. | |
| 7,140,645 B2 | 11/2006 | Cronley | |
| 7,165,570 B1 | 1/2007 | Lordahl et al. | |
| 7,174,581 B2 | 2/2007 | McNerney et al. | |
| 7,179,038 B2 | 2/2007 | Reindl | |
| 7,273,070 B2 | 9/2007 | Lin | |
| 7,306,005 B2 | 12/2007 | Moldthan | |
| 7,338,242 B2 | 3/2008 | Ellis et al. | |
| 7,658,202 B2 * | 2/2010 | Mueller et al. | 137/315.12 |
| 7,886,372 B2 | 2/2011 | Jacobs | |
| 8,231,318 B2 | 7/2012 | Pitsch et al. | |
| 8,490,276 B2 * | 7/2013 | Julian | E03C 1/0401 285/64 |
| 8,689,818 B2 * | 4/2014 | Marty et al. | 137/315.12 |
| 9,169,629 B2 * | 10/2015 | Jensen | E03D 1/26 |
| 2003/0056826 A1 * | 3/2003 | Thomas | 137/360 |
| 2003/0062087 A1 | 4/2003 | Burns et al. | |
| 2005/0199103 A1 * | 9/2005 | Thompson | B25B 13/48 81/124.2 |
| 2006/0081094 A1 * | 4/2006 | Ludwig | B25B 13/48 81/124.2 |
| 2006/0087118 A1 | 4/2006 | Andre et al. | |
| 2006/0101576 A1 | 5/2006 | Rhodes | |
| 2006/0200904 A1 | 9/2006 | Vogel et al. | |
| 2006/0207665 A1 * | 9/2006 | Giagni et al. | 137/606 |
| 2006/0243102 A1 * | 11/2006 | Vines | B25B 13/06 81/124.2 |
| 2008/0054210 A1 | 3/2008 | Smith | |
| 2008/0066584 A1 * | 3/2008 | Vines | B25B 13/06 81/124.2 |
| 2008/0133030 A1 | 6/2008 | Marty | |
| 2008/0216611 A1 * | 9/2008 | Resnick | B25B 13/04 81/124.2 |
| 2008/0277003 A1 | 11/2008 | Mueller et al. | |
| 2009/0256348 A1 * | 10/2009 | Bors et al. | 285/12 |
| 2009/0297294 A1 | 12/2009 | Li et al. | |
| 2010/0032943 A1 | 2/2010 | Li et al. | |
| 2010/0098514 A1 | 4/2010 | Silva et al. | |
| 2010/0272503 A1 * | 10/2010 | Pitsch et al. | 403/21 |
| 2011/0073205 A1 * | 3/2011 | Marty et al. | 137/801 |
| 2012/0228871 A1 | 9/2012 | Li | |
| 2012/0273075 A1 | 11/2012 | Pitsch et al. | |
| 2013/0048122 A1 * | 2/2013 | Hsu et al. | 137/625.4 |
| 2016/0305590 A1 | 10/2016 | Li | |

FOREIGN PATENT DOCUMENTS

| | | |
|---|---|---|
| CN | 200952621 | 9/2007 |
| CN | 201225474 Y | 4/2009 |
| CN | 201512831 | 6/2010 |
| CN | 201593659 | 9/2010 |
| CN | 102076599 A | 5/2011 |
| CN | 102076915 | 5/2011 |
| DE | 10 2008 042 231 A1 | 9/2008 |
| EP | 1134320 A2 | 9/2001 |
| FR | 2 936 582 A3 | 9/2008 |
| GB | 980170 A | 1/1965 |
| GB | 2463896 A | 3/2010 |

(56) References Cited

FOREIGN PATENT DOCUMENTS

| JP | 8-246521 | | 9/1996 |
|---|---|---|---|
| JP | 9-68292 | | 3/1997 |
| JP | 09242897 | A2 | 9/1997 |
| JP | 10259625 | A | 9/1998 |
| JP | 11-200437 | | 7/1999 |
| JP | 2001003408 | A | 1/2001 |
| JP | 2002106732 | A | 4/2002 |
| JP | 2004251050 | A | 9/2004 |
| JP | 2006097336 | A | 4/2006 |
| JP | 2008-88679 | | 4/2008 |
| JP | 2010007816 | A | 1/2010 |
| WO | WO 2008/059490 | A | 5/2008 |
| WO | WO 2009/155529 | A1 | 12/2009 |
| WO | WO 2009/158498 | A1 | 12/2009 |

OTHER PUBLICATIONS

PCT International Search Report and Written Opinion dated Nov. 13, 2012, 7 pages.
Elements of Design, Model # ES4461PX, Product Specification Sheet (Mar. 25, 2009); 1 page.
Herbeau Creations, 3302—'Royale' Widespread Lavatory Set, Product Specification (2003); 1 page.
Pitsch et al., U.S. Office Action dated Oct. 5, 2011, directed to U.S. Appl. No. 12/705,480; 7 pages.
International Search Report dated Jun. 16, 2010, directed to International Application No. PCT/US2010/031168; 3 pages.
International Preliminary Report on Patentability and Written Opinion dated Oct. 25, 2011, directed to International Application No. PCT/US2010/031168; 8 pages.
Office Action dated Sep. 30, 2015, directed to CA Application No. 2,742,301; 3 pages.
Li, U.S. Office Action dated Apr. 11, 2014, directed to U.S. Appl. No. 13/328,900; 13 pages.
Li, U.S. Office Action dated Aug. 29, 2014, directed to U.S. Appl. No. 13/328,900; 21 pages.
Li, U.S. Office Action dated Mar. 12, 2015, directed to U.S. Appl. No. 13/328,900; 19 pages.
Notification of the First Office Action dated Mar. 9, 2015, directed to CN Application No. 201210018359.2; 19 pages.
Notification of the Second Office Action dated Nov. 18, 2015, directed to CN Application No. 201210018359.2; 7 pages.
Response to Second Office Action dated Mar. 18, 2016, for CN Application No. 201210018359.2; 15 pages.
Notification to Grant Patent Right for Invention dated Jun. 20, 2016, directed to CN Application No. 201210018359.2; 5 pages.
Notice on the First Office Action dated Jun. 23, 2015, directed to CN Application No. 201280040131.1; 25 pages.
Notice on the Second Office Action dated May 16, 2016, directed to CN Application No. 201280040131.1; 25 pages.
Notice on the Third Office Action dated Feb. 3, 2017, directed to CN Application No. 201280040131.1; 18 pages.
Office Action dated Jun. 28, 2016, directed to JP Application No. 2014-527344; 10 pages.
Office Action dated May 9, 2017, directed to JP Application No. 2014-527344; 12 pages.

\* cited by examiner

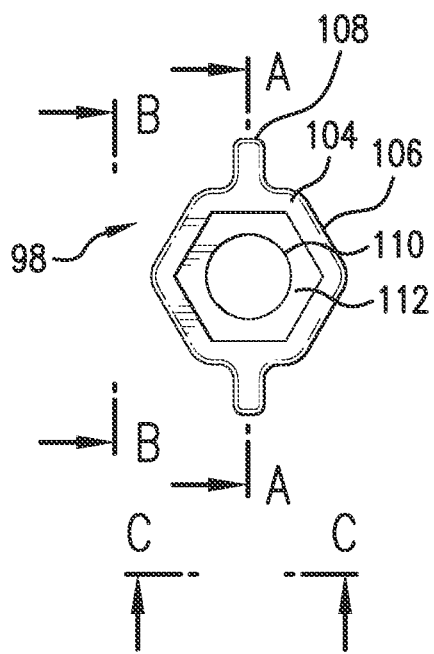
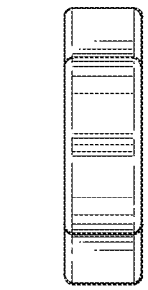
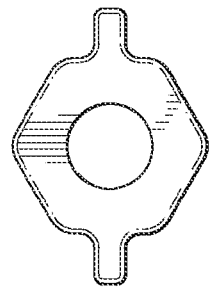
FIG.7a
FIG.7b
FIG.7c
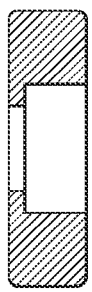
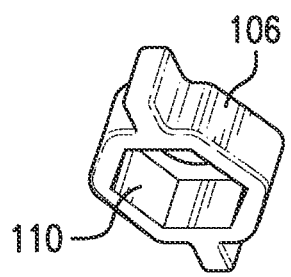
FIG.7d
FIG.7e
FIG.7f
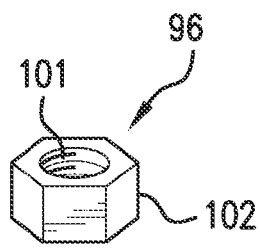
FIG.7g

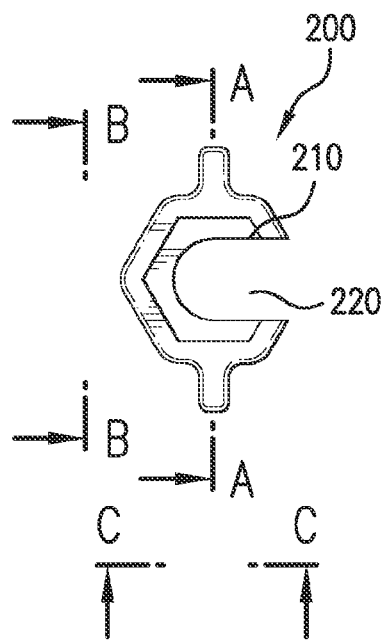
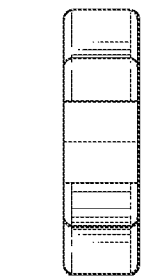
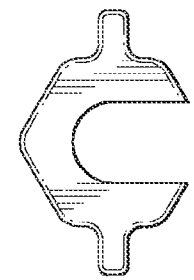
FIG.8b
FIG.8c
FIG.8a
FIG.8d
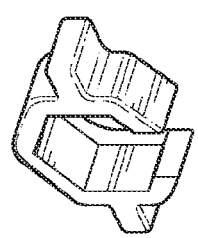
FIG.8e
FIG.8f
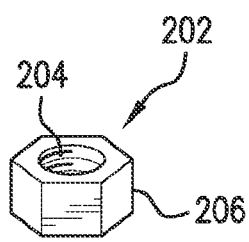
FIG.8g

US 9,835,281 B2

NO-TOOLS SPREAD FAUCET ASSEMBLY, KITS AND METHODS

CROSS-REFERENCE TO RELATED APPLICATION

This application claims the benefit under 35 U.S.C. §119 (e) to U.S. Provisional Patent Application No. 61/527,001, filed Aug. 24, 2011, the entire disclosure of which is incorporated herein by reference.

BACKGROUND OF THE INVENTION

Field of the Invention

The invention relates to plumbing fixtures such as faucets, more particularly to a no-tools method and kit for faucet assembly installation and also to a new spread faucet assembly.

Description of Related Art

Faucet assemblies present in the art typically include at least one valve assembly for controlling hot and cold water flow to a spout. The valve assembly is in fluid communication with the spout and a fluid supply such as a household water supply. The valve assembly and spout are typically mounted on a sink deck using a preformed faucet base. Other faucet assemblies, referred to as spread faucet assemblies, are known and are designed to be mounted without a traditional faucet base.

An example of a spread faucet assembly may be found in U.S. Patent Application Publication No. 2011/0073205 which shows a spread faucet assembly designed to reduce contaminants in waterways. The faucet assembly includes a water control valve assembly in fluid communication with a delivery spout. The assembly includes retainers to prevent up or down movement of the waterway in the assembly. The delivery spout and hot and/or cold water valve control assembl(ies) each have a conduit and a base. The conduit is secured at one end to a connector by a clip. The delivery spout may be secured to a sink deck via a mounting shank with an associated mounting nut and washer. Each water control valve assembly is secured to the sink deck via a threaded valve body and an associated mounting nut and washer. Each water control valve assembly has a conduit that may have a water connection coupling nut for connection to a fluid supply.

U.S. Pat. No. 6,405,749 also discloses a quick mount faucet assembly. The end body valve assemblies are each in fluid communication with a spout via interconnecting hoses attached to a T-joint connector. The spout is attached to the sink deck via a threaded rod and associated wedge nut member. Each valve assembly is attached to the sink deck via a threaded body and an associated threaded wedge nut.

European Patent Application No. EP 1 134 320 A2 teaches a three-part tap assembly having a spout and two taps designed for ease of installation. Each tap is in fluid communication with the spout via a hose connected to the tap. Each hose is shown to include an end having a nut for mating to the threaded ends of the taps.

The installation of plumbing fixtures such as spread faucet assemblies known in the art typically requires tools such as wrenches, pliers, screwdrivers, and the like. For example, a wrench is typically required for securing the spout and valve assemblies to a sink deck or a bathtub. A wrench is also typically required for connecting the hexagonal nuts on the fluid conduits of the valve assemblies to a fluid supply. Use of these tools increases the time, cost and difficulty of installing plumbing fixtures such as spread faucet assemblies, particularly in the confined spaces beneath a kitchen or lavatory sink deck or a bathtub.

Accordingly, there still exists a need in the art for a spread faucet assembly having few parts that can be installed without tools. It is important that the installer can easily and quickly mount the spread faucet assembly without tools, particularly within the small and awkward locations under a sink deck or bathtub.

BRIEF SUMMARY OF THE INVENTION

The invention includes a spread faucet assembly with few parts that can be installed without tools. In one embodiment, the spread faucet assembly includes a spout assembly having a spout, a tailpiece and at least one fluid inlet conduit; at least one valve assembly having a shank, a fluid inlet conduit, a fluid outlet conduit and a valve cartridge, wherein the shank has an inner surface having a receiving area in fluid communication with an outlet of the valve cartridge and with the fluid outlet conduit, the inner surface of the shank defines an opening in fluid communication with an inlet to the valve cartridge and with the valve assembly fluid inlet conduit, and the valve cartridge is positioned in the opening; and a connector for connecting the at least one valve assembly fluid outlet conduit with the at least one spout assembly fluid inlet conduit.

The spread faucet assembly preferably as a valve assembly shank with an inner surface that defines a bullet-shaped opening. Further, at least one of the spout assembly and the at least one valve assembly preferably includes a mounting nut. At least one spout assembly fluid inlet conduit of the spread faucet assembly is preferably attached to the spout and more preferably threadably attached to the spout. At least one of the valve assembly fluid inlet conduit and valve assembly fluid outlet conduit may be attached to the valve assembly shank.

In one embodiment, the width of the spout assembly tailpiece is about equal to the width of the at least one valve assembly shank. The spread faucet assembly preferably includes two valve assemblies, a first valve assembly for controlling hot water flow and a second valve assembly for controlling cold water flow. The connector is designed to connect each of the two valve assembly fluid outlet conduits with the spout assembly fluid inlet conduit.

The spread faucet assembly also preferably includes a fluid inlet conduit with an inlet end having a self-turning nut assembly. The self-turning nut assembly preferably includes a nut having an outer surface; and a tightening sleeve having a body with an outer surface with at least one outwardly extending projection and an inner surface shaped to contact the outer surface of the nut in facing engagement so that the tightening sleeve is capable of being hand tightened upon rotation of the at least one outwardly extending projection. The tightening sleeve is preferably slidably positioned on the valve assembly fluid inlet conduit. The nut of the self-turning nut assembly preferably includes an inner threaded surface. In one embodiment, the tightening sleeve has two, opposing, outwardly extending projections and preferably comprises a polymeric material. The polymeric material is more preferably a thermoplastic material such as polyamide or polyoxymethylene. In one embodiment, the tightening sleeve body further defines a side opening so that the tightening sleeve is capable of facing engagement of the nut of the self-turning nut assembly from a transverse direction.

The spread faucet assembly also preferably includes a connector that comprises at least one coupling capable of being manually locked and more preferably comprises a quick connect coupling with a hand tightenable locking sleeve. The spread faucet assembly preferably may be located in a lavatory, a kitchen or a bath.

The present invention further comprises a kit for installing a spread faucet assembly having a spout assembly having a spout, a tailpiece and at least one fluid inlet conduit; at least one valve assembly having a shank, a fluid inlet conduit, a fluid outlet conduit and a valve cartridge, wherein the shank has an inner surface having a receiving area in fluid communication with an outlet of the valve cartridge and with the fluid outlet conduit, the inner surface of the shank defines an opening in fluid communication with an inlet to the valve cartridge and with the valve assembly fluid inlet conduit, and the valve cartridge is positioned in the opening; a connector for connecting the at least one valve assembly fluid outlet conduit with the at least one spout assembly fluid inlet conduit; and instructions for installing a spread faucet assembly.

The kit preferably includes at least one valve assembly having a faucet handle. In a preferred embodiment, the kit includes at least one valve assembly and/or spout assembly that is preassembled. The kit is preferably for installing one of a spread lavatory faucet assembly, a spread kitchen faucet assembly, or a spread bathtub faucet assembly.

The present invention also includes a method for installing a spread faucet assembly on a mounted surface without tools. The spread faucet assembly of the method comprises a spout assembly, at least one valve assembly, and a connector, wherein the spout assembly has a spout, a tailpiece, at least one fluid inlet conduit and a mounting nut; the at least one valve assembly has a shank, a fluid inlet conduit, a fluid outlet conduit, a mounting nut, and a self-turning nut assembly and wherein the self-turning nut assembly comprises a nut and a tightening sleeve. The method includes first inserting the tailpiece of the spout assembly through a hole in a mounting surface and inserting the shank of the at least one valve assembly through a hole in the mounting surface. Next, the valve assembly mounting nut is positioned on the valve assembly shank and the spout assembly mounting nut is positioned on the spout assembly tailpiece. The valve assembly mounting nut and spout assembly mounting nut are then manually tightened to secure the valve assembly and spout assembly to the mounting surface. The at least one valve assembly fluid outlet conduit and the spout assembly fluid inlet conduit are then connected to the connector by manually locking the connector. Finally, the self-turning nut assembly is positioned on a fluid supply connection, the tightening sleeve is positioned on the nut of the self-turning nut assembly, and the tightening sleeve is manually rotated to connect the fluid inlet conduit with the fluid supply connection.

The present invention further includes a valve assembly with a shank, a fluid inlet conduit, a fluid outlet conduit and a valve cartridge, wherein the shank has an inner surface having a receiving area in fluid communication with an outlet of the valve cartridge and with the fluid outlet conduit, the inner surface of the shank defines an opening in fluid communication with an inlet to the valve cartridge and with the valve assembly fluid inlet conduit, and the valve cartridge is positioned in the opening.

The invention further includes a self-turning nut assembly having a nut having an outer surface; and a tightening sleeve having a body with an outer surface with at least one outwardly extending projection and an inner surface shaped to contact the outer surface of the nut in facing engagement so that the tightening sleeve is capable of being hand tightened upon rotation of the at least one outwardly extending projection. The nut preferably has an inner threaded surface. The tightening sleeve preferably has two, opposing, outwardly extending projections and comprises a polymeric material. The tightening sleeve is more preferably a thermoplastic material. In an alternate embodiment, the tightening sleeve body further defines a side opening so that the tightening sleeve is capable of facing engagement of the nut of the self-turning nut assembly from a transverse direction.

The present invention preferably includes one or more preassembled valve assembl(ies) and/or a spout assembly to facilitate installation. The faucet assembly can be readily installed without tools by someone with little or no prior installation experience by simply positioning the preassembled assemblies in mounting holes in the mounting surface and securing the appropriate conduits to the connector by hand and to the fluid suppl(ies) using the self-turning nut assembl(ies).

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 7a is a bottom plan view of the tightening sleeve of one embodiment of a self-turning nut assembly;

FIG. 7b is a side elevational view of the tightening sleeve of one embodiment of a self-turning nut assembly taken along line B-B of FIG. 7a;

FIG. 7c is a top plan view of the tightening sleeve of one embodiment of a self-turning nut assembly;

FIG. 7d is a further side elevational view of the tightening sleeve of one embodiment of a self-turning nut assembly taken along line C-C of FIG. 7a;

FIG. 7e is a longitudinal cross-sectional view of the tightening sleeve of one embodiment of a self-turning nut assembly taken along Section A-A of FIG. 7a;

FIG. 7f is a perspective view of the tightening sleeve of one embodiment of a self-turning nut assembly;

FIG. 7g is a perspective view of a nut for use with one embodiment of a self-turning nut assembly;

FIG. 8a is a bottom plan view of the tightening sleeve of a second embodiment of a self-turning nut assembly;

FIG. 8b is a side elevational view of the tightening sleeve of a second embodiment of a self-turning nut assembly taken along line B-B of FIG. 8a;

FIG. 8c is a top plan view of the tightening sleeve of a second embodiment of a self-turning nut assembly;

FIG. 8d is a side elevational view of the tightening sleeve of a second embodiment of a self-turning nut assembly taken along line C-C of FIG. 8a;

FIG. 8e is a longitudinal cross-sectional view of the tightening sleeve of a second embodiment of a self-turning nut assembly taken along Section A-A of FIG. 8a;

FIG. 8f is a perspective view of the tightening sleeve of a second embodiment of a self-turning nut assembly;

FIG. 8g is a perspective view of one embodiment of a nut for a second embodiment of a self-turning nut assembly.

DETAILED DESCRIPTION OF THE INVENTION

Figure 1:
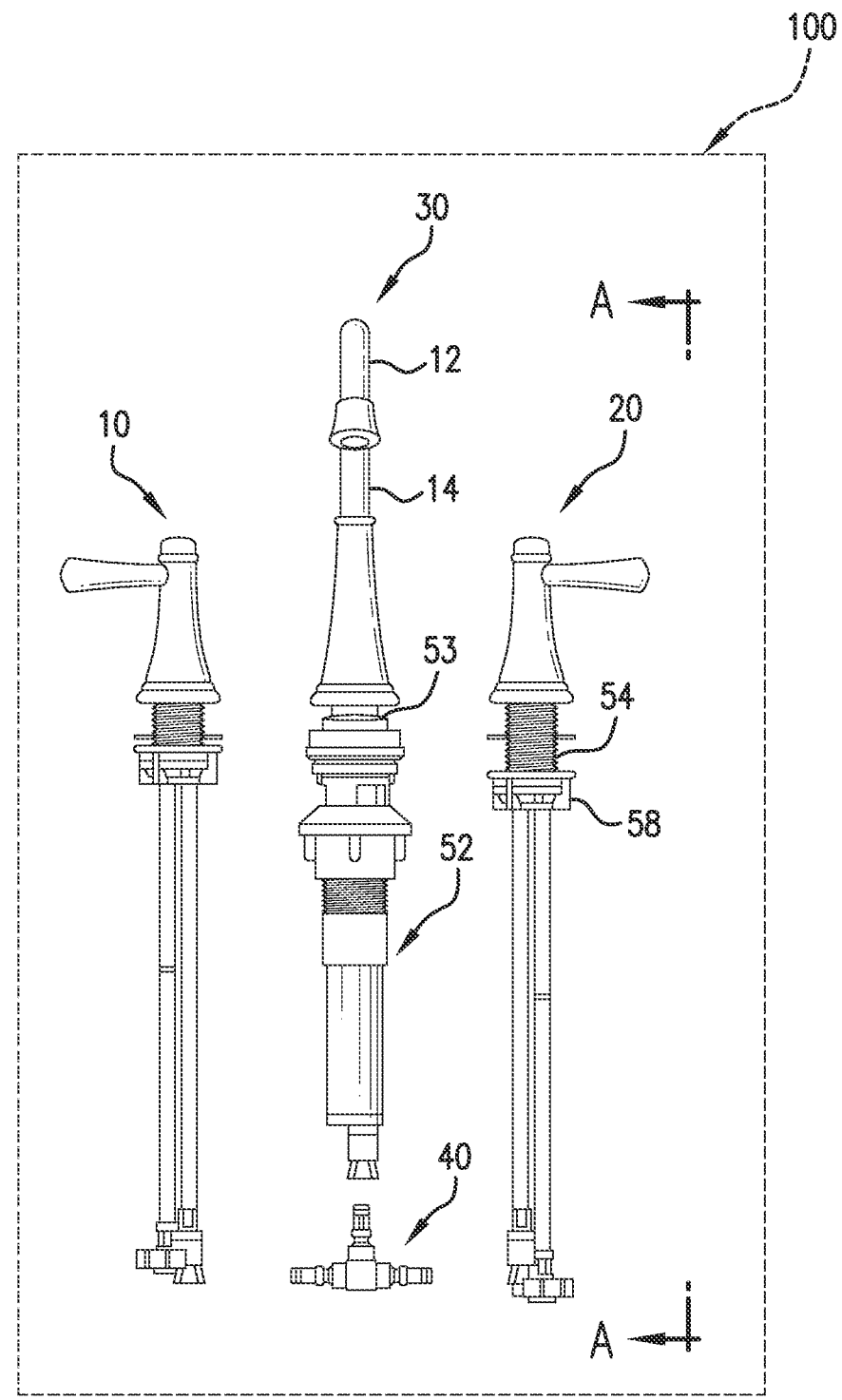
FIG. 1 is a front elevational view of an embodiment of a spread faucet assembly wherein the various components are not connected.
Figure 2:
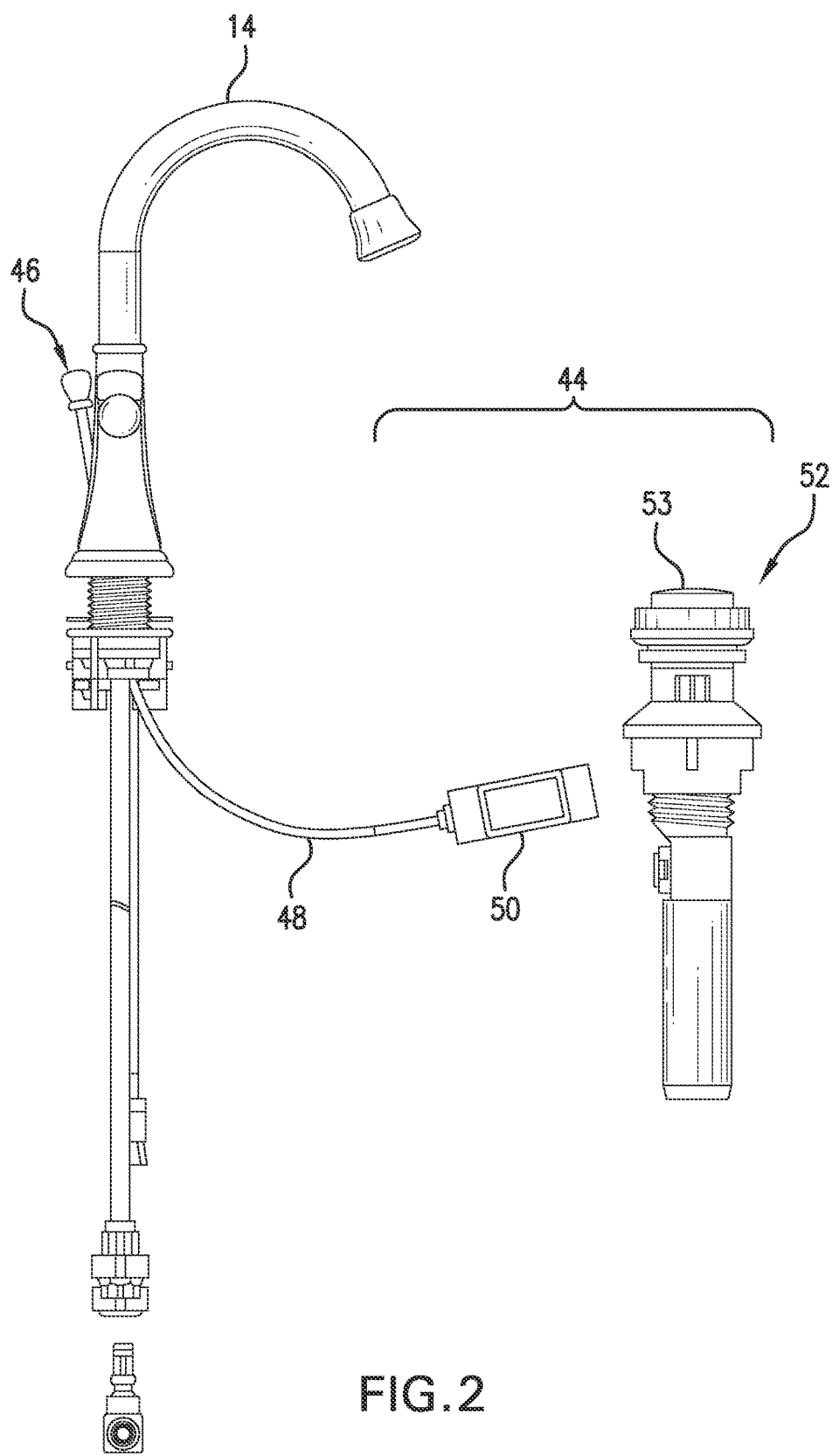
FIG. 2 is a side elevational view of the spread faucet assembly of FIG. 1.
Figure 3:
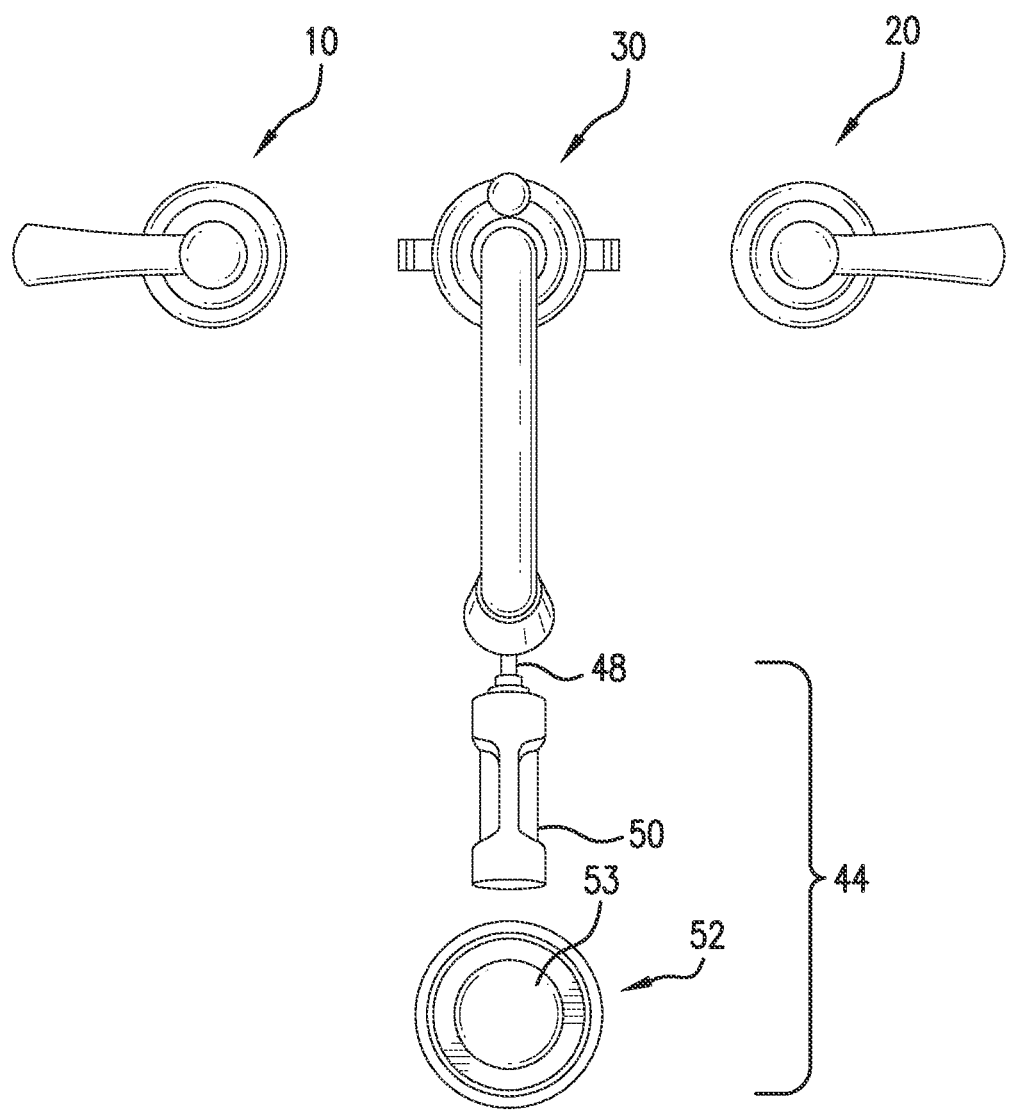
FIG. 3 is a top plan view of the spread faucet assembly of FIG. 1.
Figure 4:
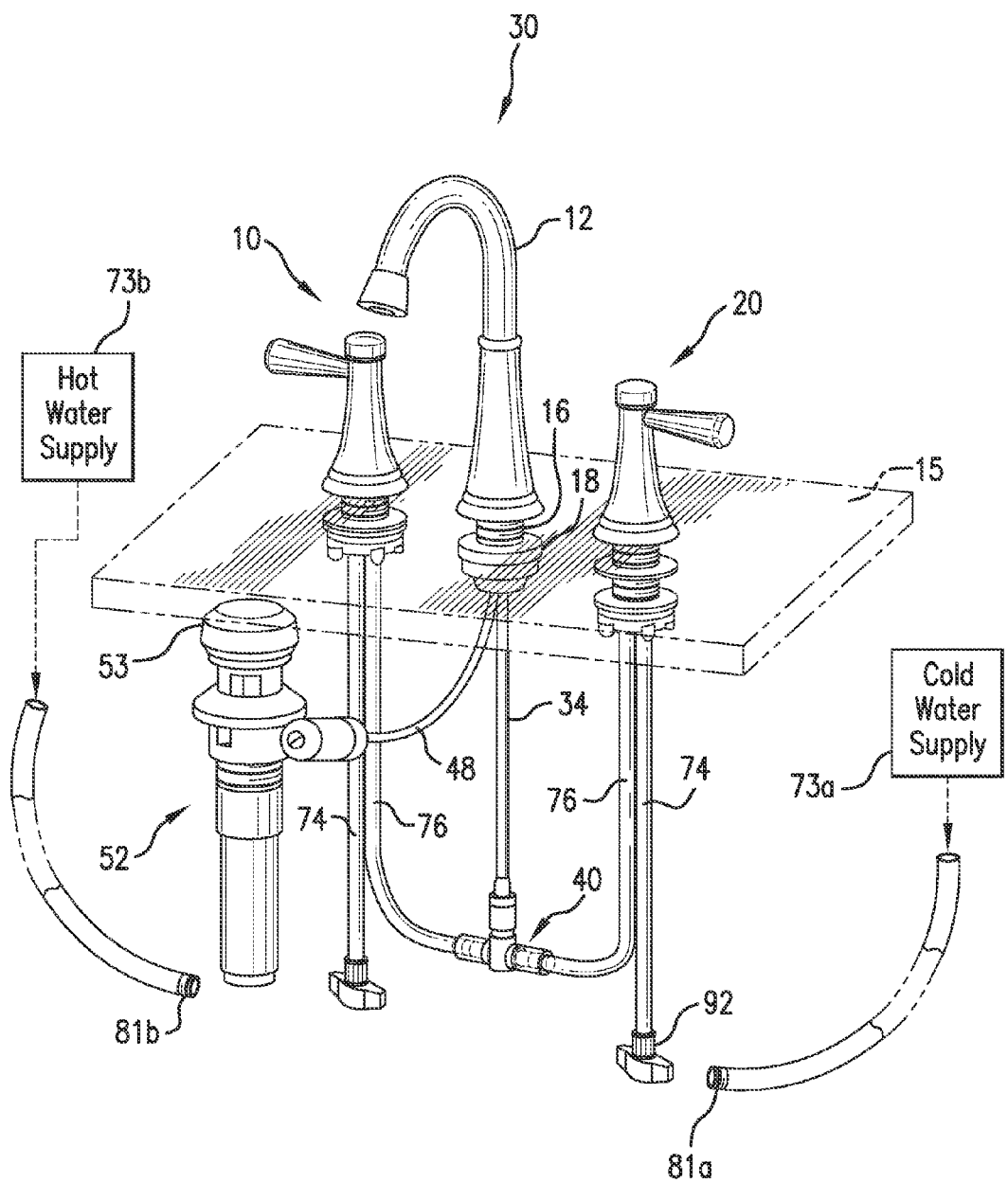
FIG. 4 is a perspective view of the spread faucet assembly of FIG. 1 with the valve and faucet components of the assembly assembled and situated on a mounting surface.

The invention includes kits and methods for installing spread faucet assemblies without the required use of tools. It also includes a spread faucet assembly, valve seat, and self-turning nut assembly. As used herein, use of tools indicates use of wrenches, pliers, ratchets and the like for tightening nuts on hose shanks, tightening nuts or clips on connectors, tightening nuts on hose connections, or the like, and/or use of any other external tools other than a user's hands to install. Manual adjustment, tightening, and the like indicates a user/installer of the spread faucet assembly is using only hand operation to carry out a given operation. A "spread faucet assembly", unless otherwise indicated herein, is intended to mean that a faucet valve assembly or assemblies are mounted and spaced remotely from a spout without requiring an interconnecting base for mounting.

As used herein, words such as "inner" and "outer," "upper" and "lower," "interior" and "exterior," and "right" and "left" and words of similar import are intended to be used to understand the invention better in conjunction with the drawings attached hereto and to have their ordinary meaning when referring to directions in the drawings. They are not intended to be limiting.

The spread faucet assembly of the invention provides the desired features noted in the background and fulfills a need in the art for such features. In one embodiment, it can be quickly, easily, and safely installed without tools particularly in the small space beneath a kitchen or lavatory sink or bathtub. The spread faucet assembly also includes a valve assembly having a valve seat and cartridge which contribute to improved control of the fluid supply. The spread faucet assembly can further include a self-turning nut assembly for connection of the spread faucet assembly to a fluid supply without tools. The spread faucet assembly may be, for example, a spread lavatory faucet assembly, a spread kitchen faucet assembly or a spread bathtub faucet assembly As shown in FIGS. 1-4, a spread faucet assembly 100 of the present invention includes at least one and preferably at least two valve assemblies 10 and 20 for controlling hot and cold fluid flow to the spout assembly 30. If two valve assemblies are used, one is typically for hot and the other for cold fluid. Each valve assembly may be configured for clockwise or counterclockwise operation or use as a hot fluid or cold fluid valve assembly. The spread faucet assembly 100 further includes a connector 40 to enable fluid communication between the valve assembl(ies) and the spout assembly.

The spout assembly 30 may have a variety of designs and configurations as are known or to be developed in the art. Preferably, the spout assembly includes a spout 12 for discharging fluid. The spout 12 has an outer surface 14 that is preferably tubular and formed into a J-shape, or other shape. However, the outer surface may be formed into any aesthetically pleasing shape including but not limited to an S-shape, C-shape, straight, etc. The spout 12 may be formed of a variety of materials, such as, for examples, metals and metal alloys (e.g., brass, nickel, titanium, stainless steel, plated steel, etc.), composites, plastic or any other suitable material that provides adequate strength and preferably surface qualities and tribological properties to function as a spout. The spout 12 is preferably formed of brass, stainless steel or plastic such as polyoxymethylenes (POM).

The spout assembly 30 further includes a tailpiece 16 for mounting the spout 12 to a mounting surface 15 such as a sink deck or bathtub. The tailpiece can be a standard piece or shank that includes an outer surface 17 that is preferably threaded and may be formed of any suitable material, including but not limited to, metals and metal alloys or polymeric or hard rubber materials (e.g., polystyrene-butadiene-styrenes (SBS), polyacrylonitrile-butadiene-styrenes (ABS), polyamides (PA), polyimides (PI), polyarylenes (polyetherether ketone (PEEK), polyether ketone (PEK), polyether ketone ketone (PEKK) and the like), polyethylene sulfones (PES), polyetherimides (PEI), polytetrafluoroethylene (PTFE), fluoroplastics (FEP and PFA), olefinic rubbers, polyethylenes (PE), polypropylenes (PP), polyvinylchloride (PVC), polyoxyalkylenes (i.e., polyacetals) such as POM, polyoxyethylenes (POE), polyoxybutylenes (POB), etc., styrene-maleic-anhydrides (SMA)). The tailpiece 16 may be formed of other similar molding materials, composites, blends and/or copolymers of these materials, provided the materials provide adequate strength and properties for mounting the spout 12. Composite materials may include fibrous and particulate materials such as glass fibers, carbon fibers, aramid fibers, Kevlar®, mica, carbon powder, and other fillers known in the art. The tailpiece is preferably formed of brass, plated steel, stainless steel or other metal or metal alloy.

Figure 5A:
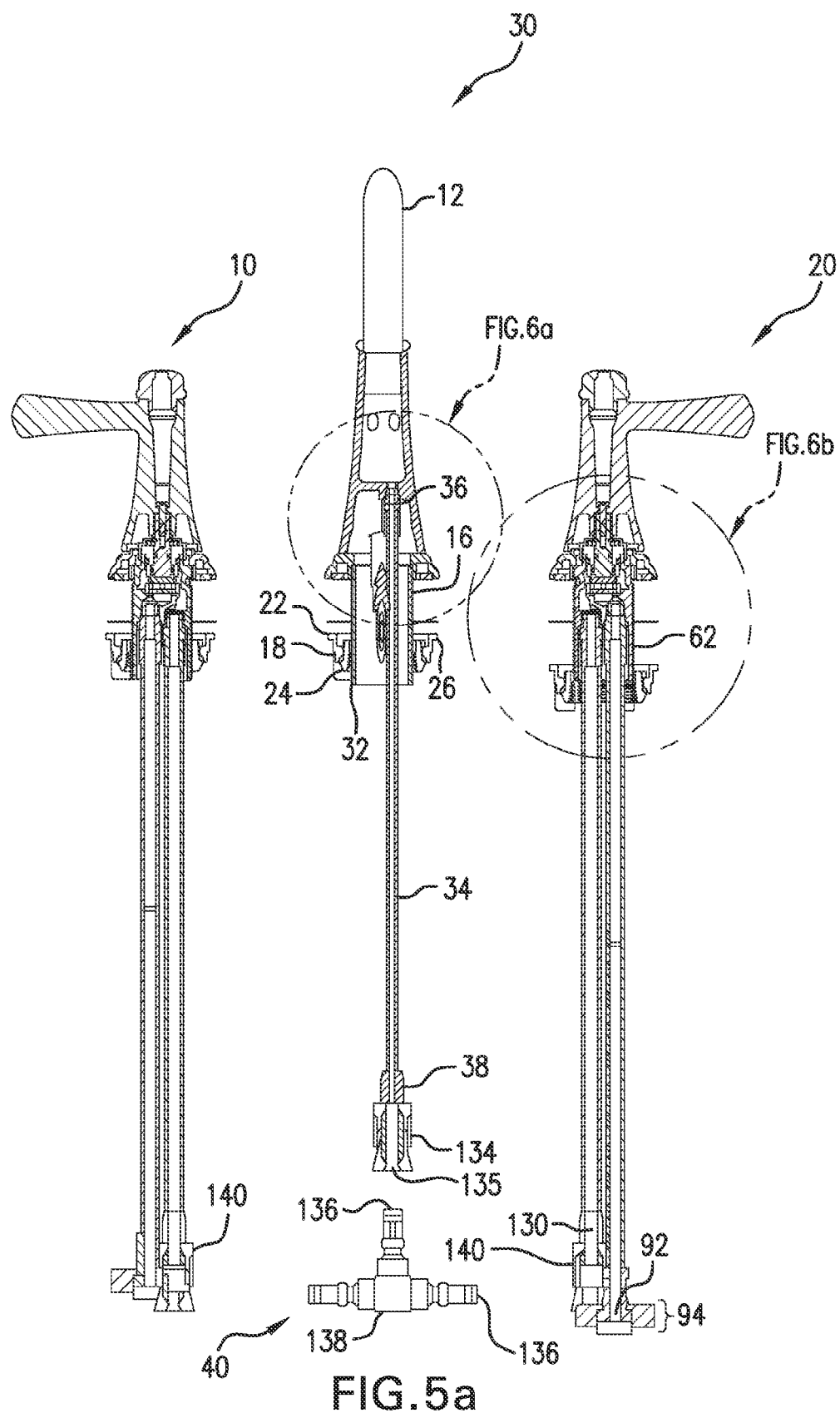
FIG. 5a is a longitudinal cross-sectional view of the faucet and valve assembly components of the spread faucet assembly of FIG. 1 in unassembled form taken along Section A-A of FIG. 1.
Figure 5B:
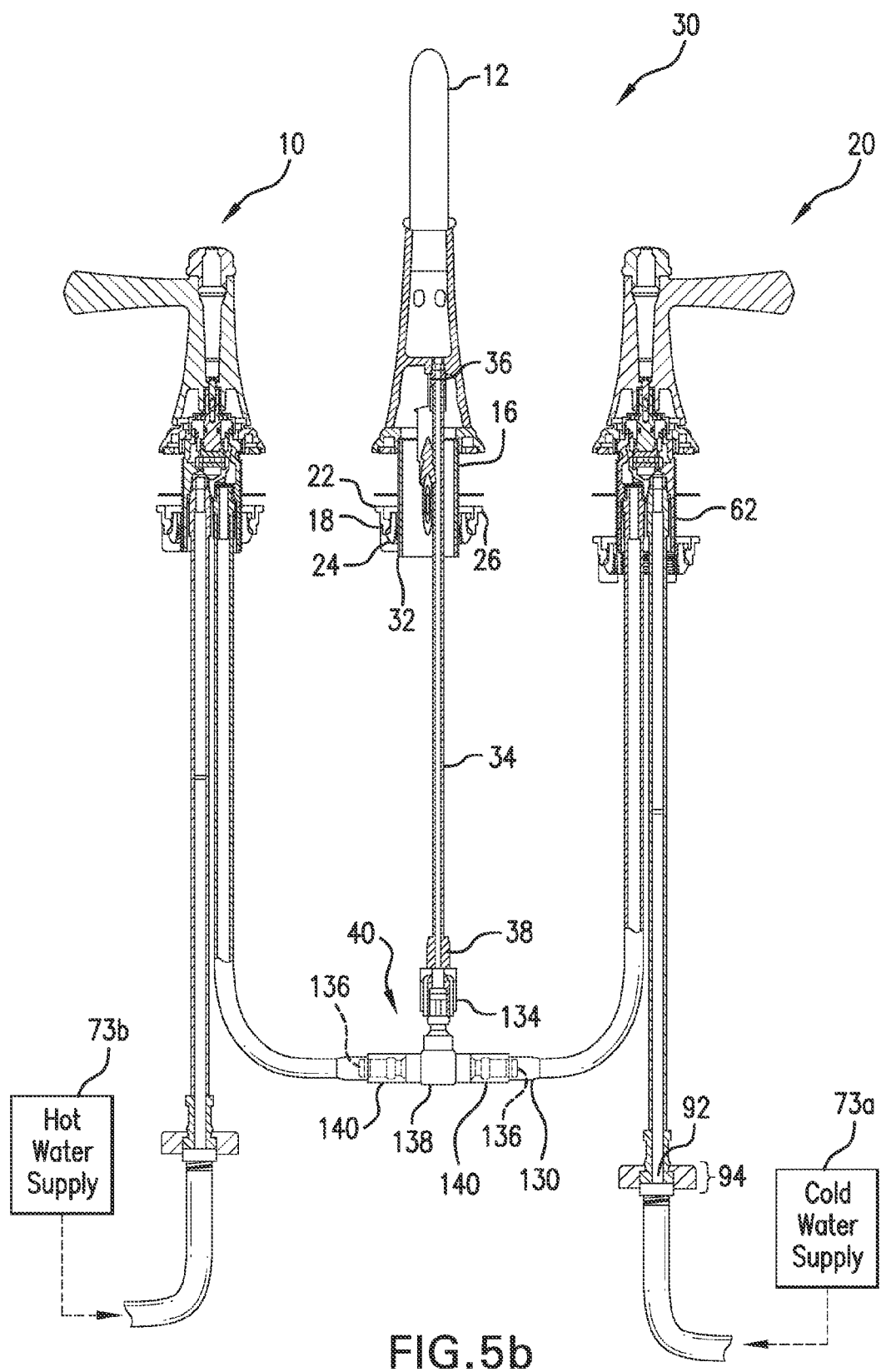
FIG. 5b is a longitudinal partial cross-sectional view of the faucet and valve assembly components of the spread faucet assembly of FIG. 1 taken along line A-A of FIG. 1, but wherein the faucet and valve components are assembled.

The spout assembly 30 further preferably includes a mounting nut 18 for securing the spout 12 to a mounting surface 15. The mounting nut may include a standard, inwardly-threaded nut that can be installed by a user in customary way, e.g., by screwing the nut and tightening to secure the spout 12. However, the mounting nut 18 is preferably a hand-operated quick connect nut such as a push and turn nut as shown in FIG. 5. The push and turn nut 18 upon pushing can slide over the tailpiece 16 until close to the top and either from user action or by impacting the upper surface (presumably a sink deck or bathtub), can be locked by hand and turned so that only a few turns, as few as one or two turns, can secure the nut in place on the preferably threaded outer surface 17 of the tailpiece 16. Any suitable push and turn nut known or to be developed may be used.

As shown in FIGS. 1 and 5, the nut may include two interlocking pieces which may be formed as one integral piece or, more preferably as two separate pieces. The first piece is an outer shell 22 and the second is an insert piece 24. The outer shell has an outer surface 26 that is configured for gripping and an inner surface 28 for engaging the insert piece 24. The insert piece has an inner surface 32 that is preferably threaded to mate with the preferably threaded outer surface 17 of the tailpiece 16.

The mounting nut 18 may be formed of any material of suitable strength for securing the spout to, for example, a sink deck or bath tub. The mounting nut is preferably formed of a polymeric material. The polymeric materials used are preferably thermoplastic moldable material such as various nylon, polycarbonate, ABS, polyimide, polyetherimide, polysulfone, polyurethane, moldable fluoropolymers (FEP or PFA for example), polyolefinic polymers, and polysilicone materials which may be homopolymers, copolymers, interpolymers and the like. In a preferred embodiment, the mounting nut 18 is of the type described in U.S. Pat. No. 8,231,318 B2, entitled "Push and Turn Nut For Quick Faucet Installation," incorporated herein in relevant part.

The spout assembly 30 further includes at least one fluid inlet conduit 34. The fluid inlet conduit 34 has outlet end 36 coupled to the spout 12 and an inlet end 38 in fluid communication with at least one of the valve assemblies 10 and 20 via a connector 40. The outlet end 36 of the fluid inlet conduit has an outer surface 37 that is attached to the inner surface 42 of the spout. The outer surface 37 is preferably threadably attached to mating threads 41 of an inner surface 42 of the spout. However, the outer surface 37 may be attached to the inner surface 42 in any acceptable manner that is known or to be developed in the art. The fluid inlet conduit is preferably pre-attached to the spout to reduce the installation difficulty and time.

The fluid inlet conduit 34 may include hoses, tubes, or pipes or any combination thereof. The conduits may be formed of any suitable material such as plastic, rubber, metal or metal alloy. The conduits are preferably hoses and more preferably hoses for supplying fluid to a sink or bathtub. The hoses may be braided, reinforced or any combination thereof suitable for supplying fluid to a sink or bathtub.

The spout assembly 30 is preferably in communication with drain assembly 44 as shown in FIGS. 1-4. Preferably, a drain assembly which is also an easy-install or rapid-install assembly is used. However, the drain assembly may include a traditional drain assembly known in the art. A rapid-install drain assembly may include a lifting rod 46 connected to a cable 48 and drain coupling 50. The drain coupling 50 may be coupled to a rapid install drain 52 that easily drops into a drain hole in a sink or bathtub. Such a coupling 50 preferably translates up and down motion of rod 46 to reciprocatable action for a stopper 53 in the drain 52. A preferred rapid-install drain is described in U.S. Pat. No. 7,886,372 B2, incorporated herein in relevant part. The drain assembly 44 may be formed of any suitable material for the intended use.

The spread faucet assembly 100 also includes at least one valve assembly for controlling the flow of hot and cold water to the spout assembly 30. As shown, valve assemblies 10 and 20 each include a shank 54. Preferably, a mounting nut 58 is used for securing the valve assembly to a mounting surface 15. The features of the valve assembly mounting nut(s) 58 may be the same or different from the nut for the spout assembly (mounting nut 18) described above. Preferably, for convenience, the mounting nuts are the same.

Each valve assembly shank 54 includes an outer surface 62 that is preferably threaded and may be formed of any suitable material, including but not limited to, metals and metal alloys or polymeric, composite and/or hard rubber materials, examples of which are described above. The valve assembly shank 54 is preferably formed of brass, stainless steel or polymeric material such as thermoplastic material.

Figure 6A:
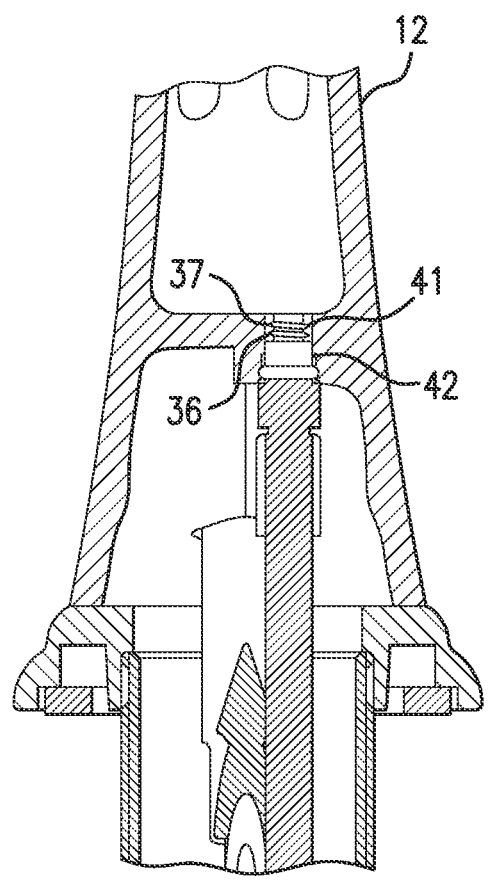
FIG. 6a is an enlarged portion of the cross-sectional view of FIG. 5a showing a spout assembly according to one embodiment.
Figure 6B:
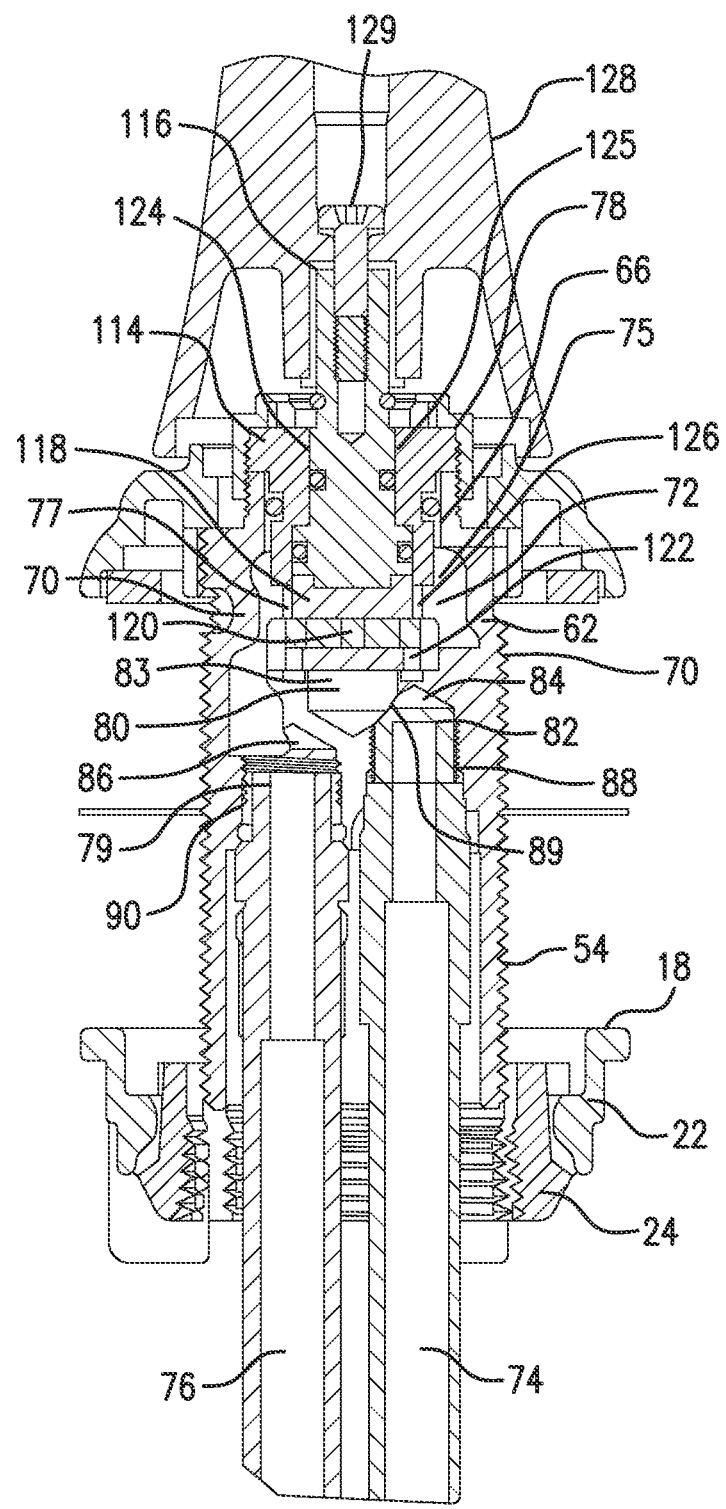
FIG. 6b is another enlarged portion of the cross-sectional view of FIG. 5a showing a valve assembly according to one embodiment.

As best shown in FIG. 6b, each valve assembly shank further includes an inner surface 66. The inner surface 55 is configured to provide a valve seat having features described herein. The upper portion of the inner surface 66 includes an inwardly extending section 70 defining a fluid receiving area 72 that extends along a portion of the inner surface 66 of the valve assembly shank 54. The fluid receiving area 72 is in fluid communication with an outlet(s) 75 and 77 of a valve cartridge 78 also included with each valve assembly and the inlet end 79 of the fluid outlet conduit 76. Based on the limited space available in the interior of the valve assembly shank, use of a smaller, more compact valve cartridge 78 such as the type described in co-pending U.S. patent application Ser. No. 13/449,582 of applicant, entitled "Faucet Valve Cartridge," incorporated herein by reference in relevant part, is preferred because it enables easy positioning within the shank. The shape of the fluid receiving area 72 may vary and is preferably sized to accommodate a minimum fluid flow rate of about 0.8 gallons per minute at about 20 pounds per square inch.

Each valve assembly shank inner surface 66 also defines an opening chamber for seating the valve cartridge 78 and receiving fluid from the fluid inlet conduit 74. The valve seat opening chamber 80 for seating the valve cartridge 78 extends downward from the upper portion of the fluid receiving area 72 and is preferably a downwardly-extending opening as shown in FIG. 6b. The opening can have a variety of shapes. Preferably, the shape is such to receive and evenly direct flow into a lower inlet of a valve cartridge seated over opening chamber 80. The valve seat opening chamber 80 is also preferably in fluid communication with the outlet end 82 of the fluid inlet conduit 74 through an opening 89 in the inner surface 66 and the inlet 83 of the valve cartridge 78. The valve seat opening chamber 80 provides a fluid reservoir for improving the control of fluid flow through the valve assembly. As shown, the opening chamber 80 is roughly bullet-shaped, but could be oval, elliptical, etc. The inner surface 66 of the valve assembly shank defines additional channel openings 84 and 86 for receiving the fluid inlet and outlet conduits. The openings 84 and 86 are preferably upwardly-extending channel openings sized to receive the conduits and having preferred ends for directing fluid from conduit 74 into opening chamber 80 and from the upper portion of receiving area 72 into the outlet conduit 76 and also serve as fluid reservoirs for improving control of fluid flow through the valve assembly.

In a preferred embodiment, each valve assembly shank 54 and spout tailpiece 16 have about the same width. Thus, the valve assemblies 10 and 20 and spout assembly 30 can be located in any position in the faucet assembly. For example, the valve assembly can be located in the central position traditionally reserved for the spout assembly. The mounting nut for each valve assembly and spout assembly are also preferably the same type and size so they become interchangeable and thus further reduce the installation difficulty and time.

As shown in FIGS. 4, 5a, 5b, 6a and 6b, the inlet end 79 of fluid outlet conduit 76 and the outlet end 82 of fluid inlet conduit 74 are coupled to the valve assembly shank 54. The fluid outlet conduit 76 is in fluid communication with the spout 12 via a coupling 40 secured to the spout assembly 30. The inlet end 79 of the fluid outlet conduit and the outlet end 82 of the fluid inlet conduit are attached to the inner surface 66 of the valve assembly shank 54. The inlet end 79 of the fluid outlet conduit and the outlet end 82 of the fluid inlet conduit outer surface are preferably threadably attached to mating threads 88 and 90 of the inner surface 66 of the valve assembly shank 54. However, the conduit ends may be attached to the inner surface 66 in any acceptable manner that is known or to be developed in the art. The fluid inlet and outlet conduits 74 and 76 are preferably pre-attached to the valve assembly to reduce the installation difficulty and time. The conduits are also preferably coded to facilitate installation. In a preferred embodiment, the fluid inlet conduit of each valve assembly includes a colored stripe along its exterior surface to distinguish it from the fluid outlet conduit.

The fluid inlet and outlet conduits 74 and 76 of the valve assembly may include hoses, tubes, or pipes or any combination thereof. The conduits may be formed of any suitable material such as plastic, rubber, metal or metal alloy. The conduits are preferably hoses and more preferably hoses for supplying fluid to a kitchen faucet, a lavatory faucet, or bathtub. The hoses may be braided, reinforced or any combination thereof suitable for supplying fluid to a sink or bathtub.

The fluid inlet conduit 74 of the valve assembly further includes an inlet end 92 for connecting to a fluid supply 73 such as a household water supply. As shown in FIG. 5, the inlet end 92 preferably has a self-turning nut assembly 94 for connecting the fluid inlet conduit to the fluid supply without tools. A "self-turning nut assembly" as that term is used herein refers to a nut assembly that can be tightened by hand without tools. As best shown in FIGS. 7a-7g, the self-turning nut assembly 94 includes a nut 96 and a tightening sleeve 98. The features of the nut 96 are dependent on the type of fluid supply connection. The nut 96 preferably has a threaded inner surface 101 and an outer surface 102 having a hexagonal shape.

One embodiment of the tightening sleeve 98 of the self-turning nut assembly 94 is shown in FIGS. 7a-7f. In this embodiment, the tightening sleeve is preferably positioned on the fluid inlet conduit 74 of the valve assembly, but may be included as a separate piece. The tightening sleeve 98 is designed to secure the nut 96 to a fluid supply connection 81 without tools. The tightening sleeve 98 includes a body 104 with an outer surface 106 that includes at least one outwardly extending projection 108. In a preferred embodiment, the outer surface preferably includes two, opposing outwardly extending projections. The body 104 further includes an inner surface 110 shaped to contact the outer surface 102 of the nut 96 in facing engagement so that the tightening sleeve is capable of the being hand tightened upon rotation of the at least one outwardly extending projection 108. The inner surface 110 may include an inwardly extending portion 112 as shown in FIG. 7a. The inner surface 110 may be configured in any suitable shape for lockingly engaging the outer surface 102 of the nut including but not limited to a circle, square, rectangle, hexagon and the like.

The tightening sleeve may be formed of any suitable material, including but not limited to, metals and metal alloys or polymeric or hard rubber materials, examples of which are described above. The tightening sleeve 98 may be formed of other similar molding materials, composites, blends and/or copolymers of these materials, provided the materials provide adequate strength and properties for tightening a nut. The tightening sleeve 98 is preferably formed of a thermoplastic material. It is more preferably formed of PA or POM.

FIGS. 8a-8f shows a second alternative embodiment of a tightening sleeve 200 of the self-turning nut assembly. FIG. 8g shows a nut 202 with features of the nut 96 including a threaded inner surface 204 and an outer surface 206 having a hexagonal shape. The features of the tightening sleeve 200 of the second embodiment generally match the features of the tightening sleeve 98 of the first embodiment. However, the body 210 of the tightening sleeve 200 defines a side opening 220 so that the tightening sleeve 200 is capable of facing engagement of the nut from a transverse or lateral direction. The tightening sleeve 200 of the second embodiment can be included with the faucet assembly as a separate piece. Thus, one tightening sleeve can be used to attach more than one nut to a fluid supply connection, thereby reducing the number parts required for assembly of the faucet.

Each valve assembly further includes a valve cartridge 78 for controlling the flow of fluid through the valve assembly. The valve cartridge 78 is positioned in the valve seat opening chamber 80 and so that its outlets 75 and 77 are in fluid communication with the fluid receiving area 72 within the valve assembly shank 54. The valve cartridge 78 preferably includes a body 114, a spindle 116, a movable disk 118, a stationary disk 120, and a sealing ring 122. The body 114 has an inner surface 125 defining a longitudinally extending passage 124 therethrough and at least one side opening 126 extending transversely through the body. The spindle 116 is configured to fit in rotatable relationship with the inner surface of the body. The movable disk 118 is positioned below the spindle 116 within the body and is configured so that it can be rotated to align with at least one side opening 126 in the body for allowing fluid flow out of the at least one side opening 126 of the body into the fluid receiving area 72. The stationary disk 120 is positioned below the moveable disk 118 and the sealing ring 122 is positioned above the valve seat opening chamber 80 and below the moveable disk 118 for retaining the moveable and stationary disks within the valve body.

The valve cartridge may be formed of a variety of materials, such as, for example, metals and metal alloys as well as polymeric or hard rubber materials, examples of which are described above. Other similar molding materials, composites, blends and/or copolymers of these materials, and other materials may be used provided the materials provide adequate strength and preferably surface qualities and tribological properties to function as a valve cartridge. The valve cartridge is preferably comprises PPS, PPO, PA or a POM copolymer such as CELCON® M90 CF-2001, commercially available from Ticona, a division of Celanese, or DELRIN®, commercially available from E. I. DuPont de Nemours & Company. Composites comprising these materials compatibilized with one or more thermoplastic or rubber as noted above can be prepared also to reduce wear and enhance tribological properties. As stated above, the valve cartridge 78 is preferably of the type described in co-pending U.S. patent application Ser. No. 13/449,582, entitled "Faucet Valve Cartridge," incorporated herein by reference in relevant part.

Each valve assembly also includes a faucet handle 128 positioned on the valve cartridge spindle 116. As shown in FIG. 6b, the faucet handle may be secured to the valve cartridge via a conventional threaded screw 129. However, other designs and handle connections can be used. The faucet handle 128 may take any functional shape for rotating the valve cartridge. The faucet handle 128 may be formed of a variety of materials, such as, for examples, metals, metal alloys, and plastics, examples of which are described above, or any other suitable material that provides adequate strength to function as a faucet handle.

As shown in FIGS. 1, 4, 5a and 5b, the faucet assembly further includes a connector 40 for securing the outlet end 130 of the each valve assembly fluid outlet conduit 76 to the inlet end 38 of the spout assembly fluid inlet conduit. The connector preferably is a quick connection coupling 132 that can be manually locked to facilitate tools-free installation. The quick connection coupling 132 preferably includes a female section 134 having at least one projection 135. The female section 134 is preferably connected to the ends of the fluid conduits while a corresponding male section 136 that depends from and/or is connected to a tee 138 or similar multihead fitting. The coupling 132 also preferably includes a locking piece 140 such as a locking sleeve positioned on the female section and capable of sliding along the female section when inserted over a male section so as to engage the at least one projection and the male section and releasably lock the female section and the male section together. In a preferred embodiment shown in FIGS. 5a and 5b, a female coupling section is secured to each of the ends of the valve assembly fluid outlet conduits and the spout fluid inlet conduit and three male coupling sections are secured to a tee. The male coupling sections can be inserted into the female coupling sections and the locking pieces on the female section can be used to manually lock the connector and thus connect the valve assembly conduits with the spout assembly conduit.

The connector may be formed using a variety of materials, such as, for examples, metals and metal alloys as well as polymeric or hard rubber materials, examples of which are described above. Other similar molding materials, composites, blends and/or copolymers of these materials may be used provided the materials provide adequate strength and preferably surface qualities and properties to function as components of a fluid connector. Composite materials may include fibrous and particulate materials such as glass fibers, carbon fibers, aramid fibers, Kevlar®, mica, carbon powder, and other fillers known in the art. The male section 136 and locking piece 140 are preferably formed of a composite material including PA reinforced with glass fiber, more preferably PA reinforced with about 33% glass fiber, and the female section 134 is preferably formed of POM. In the preferred embodiment shown in FIG. 5, the connector 40 includes a tee and three couplings of the type described in co-pending U.S. patent application Ser. No. 13/328,900, entitled "Quick Connection Coupling," incorporated herein by reference in relevant part. Other quick connecting or manually tightenable connectors may connectors may also be used as are known in the art.

Once the faucet assembly is installed, each valve assembly controls the flow of fluid to the spout 12. Rotation of the faucet handle 128 allows fluid to flow through the valve assembly fluid inlet conduit 74 and valve seat opening chamber 80 through the bottom of the valve cartridge 78 then out side opening 126 of the valve cartridge. The fluid then travels generally circumferentially in the fluid receiving area 72 of the valve assembly shank 54 and into the valve assembly fluid outlet conduit 76. The fluid then flows through the connector 40, through the spout assembly fluid inlet conduit 34 and into the spout 12.

Figure 9:
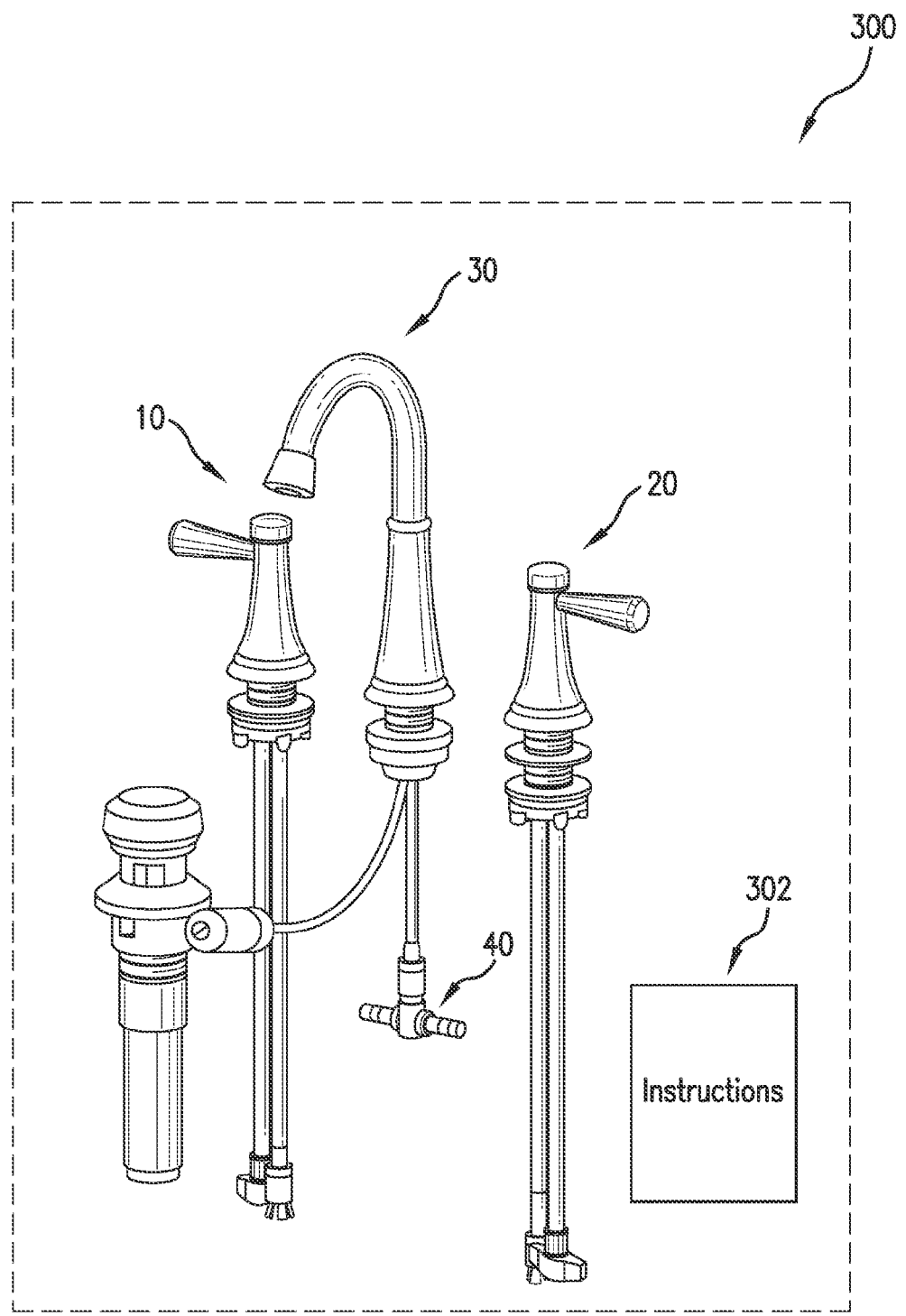
FIG. 9 is a perspective view of an unassembled embodiment of a spread faucet assembly kit.
Figure 10:
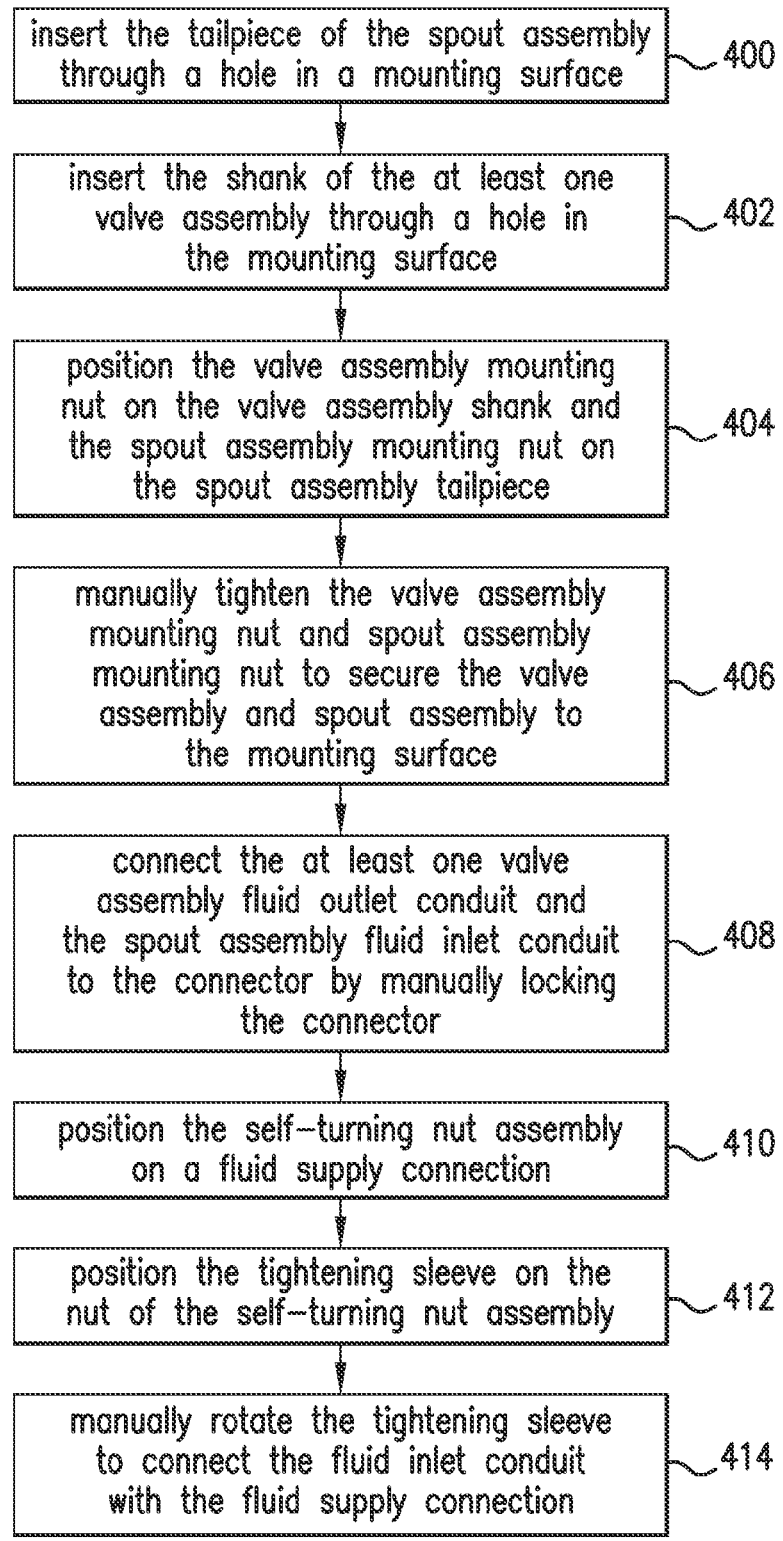
FIG. 10 is a flowchart showing steps in a method of installing a spread faucet assembly according to an embodiment of the present invention.

The present invention further includes a kit 300 shown on FIG. 9 and method of installing a spread faucet assembly without tools shown on FIG. 10. The kit 300 includes the components of a faucet assembly as described above including a spout assembly, at least one valve assembly, a connector, and instructions 302 for installing the spread faucet assembly. The valve assembly includes a fluid receiving area along the inner surface of the valve assembly shank and the valve seat opening chamber as described above. Further, the conduits are preferably preinstalled in the spout and valve assembly to reduce installation time. The kit also preferably includes a self-turning nut assembly as described above and may include one or more of such assemblies and mounting nuts.

The instructions 302 preferably describe the method of installation herein. A method of installing without tools a spread faucet assembly having a spout assembly, at least one valve assembly, and a connector as described above is also included and shown in the flow chart of FIG. 10. The method includes a step 400 of inserting a tailpiece of the spout assembly through a hole in a mounting surface such as a sink deck or bathtub. Such holes can be formed in the ordinary manner used for typical sink mounting, however, since the portions of the assembly can be spread, the location of installation can vary and should be measured accurately. The method also includes the step 402 of inserting the shank of the at least one valve assembly through another hole in the mounting surface. Further steps 404 and 406 include positioning the mounting nuts on the valve assembly shank(s) and spout assembly tailpiece and manually tightening the mounting nuts to secure the valve assembly and spout assembly to the mounting surface. In step 408, the valve assembly fluid outlet conduit(s) and the spout assembly fluid inlet conduit are then preferably secured to the connector by manually locking the connector, preferably by sliding the locking piece of each conduit on at least one male fitting of a connector or coupling. The method includes a further step 410 in which the self-turning nut assembly is then positioned on a fluid supply connection. The tightening sleeve is positioned in step 412 on the nut of the self-turning nut assembly, and the tightening sleeve is manually rotated (step 414) to connect the fluid inlet conduit with the fluid supply connection. The preferred method steps are shown in FIG. 10.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A spread faucet assembly, comprising:
 (a) a spout assembly having a spout, a tailpiece and at least one fluid inlet conduit, wherein the spout, the tailpiece and the at least one fluid inlet conduit are pre-assembled;
 (b) at least one valve assembly having a shank, a fluid inlet conduit, a fluid outlet conduit and a valve cartridge wherein the shank, the fluid inlet conduit, the fluid outlet conduit and the valve cartridge are pre-assembled, wherein
  the shank has an inner surface having a receiving area in fluid communication with an outlet of the valve cartridge and with the fluid outlet conduit,
  the inner surface of the shank defines an opening in fluid communication with an inlet to the valve cartridge and with the valve assembly fluid inlet conduit, and
  the valve cartridge is positioned in the opening; and
 (c) a connector selected from a quick connection connector or a manually tightenable connector and configured to be capable of manually connecting the at least one valve assembly fluid outlet conduit with the at least one spout assembly fluid inlet conduit;

(d) at least one self-turning nut assembly positioned on an inlet end of the fluid inlet conduit of the at least one valve assembly, the at least one self-turning nut assembly comprising:

a nut having an outer surface; and a tightening sleeve having a body with an outer surface with at least one outwardly extending projection, wherein the outwardly extending projection extends outward beyond an outermost rim of the tightening sleeve, and an inner surface shaped to lockingly engage the outer surface of the nut, and wherein the at least one self-turning nut assembly, when completely installed, is fully tightened manually by the tightening sleeve as the sleeve is slidably positioned on and fully encircling the valve assembly fluid inlet conduit.

2. The spread faucet assembly of claim 1, wherein the at least one spout assembly fluid inlet conduit is attached to the spout.

3. The spread faucet assembly of claim 2, wherein the at least one spout assembly fluid inlet conduit is threadably attached to the spout.

4. The spread faucet assembly of claim 1, wherein at least one of the valve assembly fluid inlet conduit and valve assembly fluid outlet conduit is attached to the valve assembly shank.

5. The spread faucet assembly of claim 4, wherein at least one of the valve assembly fluid inlet conduit and valve assembly fluid outlet conduit is threadably attached to the valve assembly shank.

6. The spread faucet assembly of claim 1, further comprising two valve assemblies.

7. The spread faucet assembly of claim 6, further comprising a first valve assembly for controlling hot water flow and a second valve assembly for controlling cold water flow.

8. The spread faucet assembly of claim 7, wherein the connector connects each of the outlet conduits of the two valve assemblies with the spout assembly fluid inlet conduit.

9. The spread faucet assembly of claim 1, wherein the tightening sleeve comprises a polymeric material.

10. The spread faucet assembly of claim 9, wherein the polymeric material is a thermoplastic material.

11. The spread faucet assembly of claim 10, wherein the polymeric material is polyamide or polyoxymethylene.

12. The spread faucet assembly of claim 1, wherein the connector comprises at least one coupling capable of being manually locked.

13. The spread faucet assembly of claim 12, wherein the connector comprises a quick connect coupling with a hand tightenable locking sleeve.

14. The spread faucet assembly of claim 1, wherein the inner surface of the shank defines a bullet-shaped opening.

15. The spread faucet assembly of claim 1, wherein the spout further comprises a first hand-operated mounting nut, configured to be fully tightened by hand and the at least one valve assembly comprises a second mounting nut, wherein the second mounting nut is interchangeable with the first mounting nut.

16. The spread faucet assembly of claim 1, wherein a width of the spout assembly tailpiece is about equal to a width of the at least one valve assembly shank.

17. The spread faucet assembly of claim 1, wherein the nut further comprises an inner threaded surface.

18. The spread faucet assembly of claim 1, wherein the tightening sleeve has two, opposing, outwardly extending projections.

19. The spread faucet assembly of claim 1, wherein the spread faucet assembly is one of a spread lavatory faucet assembly, a spread kitchen faucet assembly, or a spread bathtub faucet assembly.

20. A kit for installing a spread faucet assembly, comprising: a spread faucet assembly comprising (a) a spout assembly having a spout, a tailpiece and at least one fluid inlet conduit, wherein the spout, the tailpiece and the at least one fluid inlet conduit are pre-assembled;

(b) at least one valve assembly having a shank, a fluid inlet conduit, a fluid outlet conduit and a valve cartridge, wherein the shank, the fluid inlet conduit, the fluid outlet conduit and the valve cartridge are pre-assembled and wherein the shank has an inner surface having a receiving area in fluid communication with an outlet of the valve cartridge and with the fluid outlet conduit, the inner surface of the shank defines an opening in fluid communication with an inlet to the valve cartridge and with the valve assembly fluid inlet conduit, and the valve cartridge is positioned in the opening;

(c) a connector selected from a quick connection connector or a manually tightenable connector and configured to be capable of manually connecting the at least one valve assembly fluid outlet conduit with the at least one spout assembly fluid inlet conduit, (d) at least one self-turning nut assembly positioned on an inlet end of the fluid inlet conduit of the at least one valve assembly, the at least one self-turning nut assembly comprising:

a nut having an outer surface; and a tightening sleeve having a body with an outer surface with at least one outwardly extending projection, wherein the outwardly extending projection extends outward beyond an outermost rim of the tightening sleeve, and an inner surface shaped to lockingly engage the outer surface of the nut, and wherein the at least one self-turning nut assembly, when completely installed, is fully tightened manually by the tightening sleeve as the sleeve is slidably positioned on and fully encircling the valve assembly fluid inlet conduit; and instructions for installing the spread faucet assembly.

21. The kit of claim 20, wherein the at least one valve assembly further comprises a faucet handle.

22. The kit of claim 20, wherein the kit is for installing one of a spread lavatory faucet assembly, a spread kitchen faucet assembly, or a spread bathtub faucet assembly.

23. A valve assembly, comprising:

a shank, a fluid inlet conduit, a fluid outlet conduit and a valve cartridge, wherein the shank has an inner surface having a receiving area in fluid communication with an outlet of the valve cartridge and with the fluid outlet conduit, the inner surface of the shank defines an opening in fluid communication with an inlet to the valve cartridge and with the valve assembly fluid inlet conduit, the valve cartridge is positioned in the opening, and the fluid inlet conduit has an inlet end having a self-turning nut assembly comprising:

a nut having an outer surface; and a tightening sleeve having a body with an outer surface with at least one outwardly extending projection, wherein the outwardly extending projection extends outward beyond an outermost rim of the tightening sleeve, and an inner surface shaped to contact the outer surface of the nut in facing engagement so that the tightening sleeve, when completely installed, is fully tightened by hand upon rotation of the at least one outwardly extending projection as the sleeve is slidably positioned on and fully encircling the valve assembly fluid inlet conduit.

24. A method for installing a spread faucet assembly on a mounted surface, wherein the spread faucet assembly comprises a pre-assembled spout assembly, at least one pre-assembled valve assembly, and a connector selected from a quick connection connector or a manually tightenable connector, wherein the spout assembly has a spout, a tailpiece, at least one fluid inlet conduit and a mounting nut; the at least one valve assembly has a shank, a fluid inlet conduit, a fluid outlet conduit, a hand-operated mounting nut configured to be fully tightened by hand, and a self-turning nut assembly and wherein the self-turning nut assembly comprises a nut and a tightening sleeve having a body with an outer surface with at least one outwardly extending projection, wherein the outwardly extending projection extends outward beyond an outermost rim of the tightening sleeve, and an inner surface shaped to lockingly engage the outer surface of the nut, and wherein the tightening sleeve is configured to fully and securely connect the valve assembly fluid inlet conduit with a fluid supply connection while slidably positioned on and fully encircling the valve assembly fluid inlet conduit; the method comprising:

(a) inserting the tailpiece of the spout assembly through a hole in a mounting surface;
(b) inserting the shank of the at least one valve assembly through a second hole in the mounting surface;
(c) positioning the valve assembly mounting nut on the valve assembly shank and the spout assembly mounting nut on the spout assembly tailpiece;
(d) manually tightening the valve assembly mounting nut and spout assembly mounting nut to fully secure the valve assembly and spout assembly to the mounting surface;
(e) connecting the at least one valve assembly fluid outlet conduit and the spout assembly fluid inlet conduit to the connector by manually locking the connector;
(f) positioning the self-turning nut assembly on the fluid supply connection;
(g) positioning the tightening sleeve on the nut of the self-turning nut assembly; and
(h) manually rotating the tightening sleeve by hand to fully and securely connect the fluid inlet conduit with the fluid supply connection.

* * * * *